United States Patent
Leuchtenberg et al.

(10) Patent No.: US 10,435,966 B2
(45) Date of Patent: Oct. 8, 2019

(54) APPARATUS AND METHOD FOR DEGASSING DRILLING FLUIDS

(71) Applicant: Managed Pressure Operations Pte. Ltd., Singapore (SG)

(72) Inventors: Christian Leuchtenberg, Singapore (SG); Brian Piccolo, Singapore (SG)

(73) Assignee: MANAGED PRESSURE OPERATIONS PTE LTD, Singapore (SG)

( * ) Notice: Subject to any disclaimer, the term of this patent is extended or adjusted under 35 U.S.C. 154(b) by 573 days.

(21) Appl. No.: 14/572,492

(22) Filed: Dec. 16, 2014

(65) Prior Publication Data
US 2015/0167413 A1     Jun. 18, 2015

(30) Foreign Application Priority Data
Dec. 17, 2013 (GB) .................................. 1322326.8

(51) Int. Cl.
| | | |
|---|---|---|
| *E21B 21/06* | (2006.01) | |
| *B01D 19/00* | (2006.01) | |
| *B01D 45/12* | (2006.01) | |
| *E21B 17/01* | (2006.01) | |
| *E21B 21/10* | (2006.01) | |
| *E21B 33/035* | (2006.01) | |
| *E21B 33/06* | (2006.01) | |

(52) U.S. Cl.
CPC ........ *E21B 21/067* (2013.01); *B01D 19/0042* (2013.01); *B01D 19/0057* (2013.01); *B01D 19/0063* (2013.01); *B01D 45/12* (2013.01); *E21B 17/01* (2013.01); *E21B 21/106* (2013.01); *E21B 33/035* (2013.01); *E21B 33/06* (2013.01)

(58) Field of Classification Search
CPC ...... E21B 21/067; E21B 17/01; E21B 21/106; E21B 33/035; E21B 33/06; B01D 19/0042; B01D 19/0057; B01D 19/0063; B01D 45/12
USPC .......................................................... 166/357
See application file for complete search history.

(56) References Cited

U.S. PATENT DOCUMENTS

| | | |
|---|---|---|
| 1,861,726 A | 6/1932 | Trout |
| 2,155,837 A | 4/1939 | Penick et al. |
| 2,192,805 A | 3/1940 | Seamark |
| 3,241,295 A | 3/1966 | Griffin, III et al. |
| 3,313,345 A | 4/1967 | Fischer |
| 3,362,136 A | 1/1968 | Burnham, Sr. et al. |

(Continued)

FOREIGN PATENT DOCUMENTS

| | | |
|---|---|---|
| CN | 1553984 A | 12/2004 |
| CN | 1611742 A | 5/2005 |

(Continued)

*Primary Examiner* — Anna M Momper
*Assistant Examiner* — Patrick F Lambe
(74) *Attorney, Agent, or Firm* — Norman B. Thot

(57) ABSTRACT

An apparatus for degassing drilling fluid comprising a primary separator and a secondary separator, the primary separator comprising a vessel body having an inlet port, a liquid outlet port located at a lower end of the vessel body, and a gas vent port located at an upper end of the vessel body, the secondary separator having an inlet port which is connected to the gas vent port of the primary separator, a gas outlet port, and a liquid outlet port which is connected to the interior of the vessel body of the primary separator via a liquid return line.

23 Claims, 4 Drawing Sheets

(56) References Cited

U.S. PATENT DOCUMENTS

Figure 1:
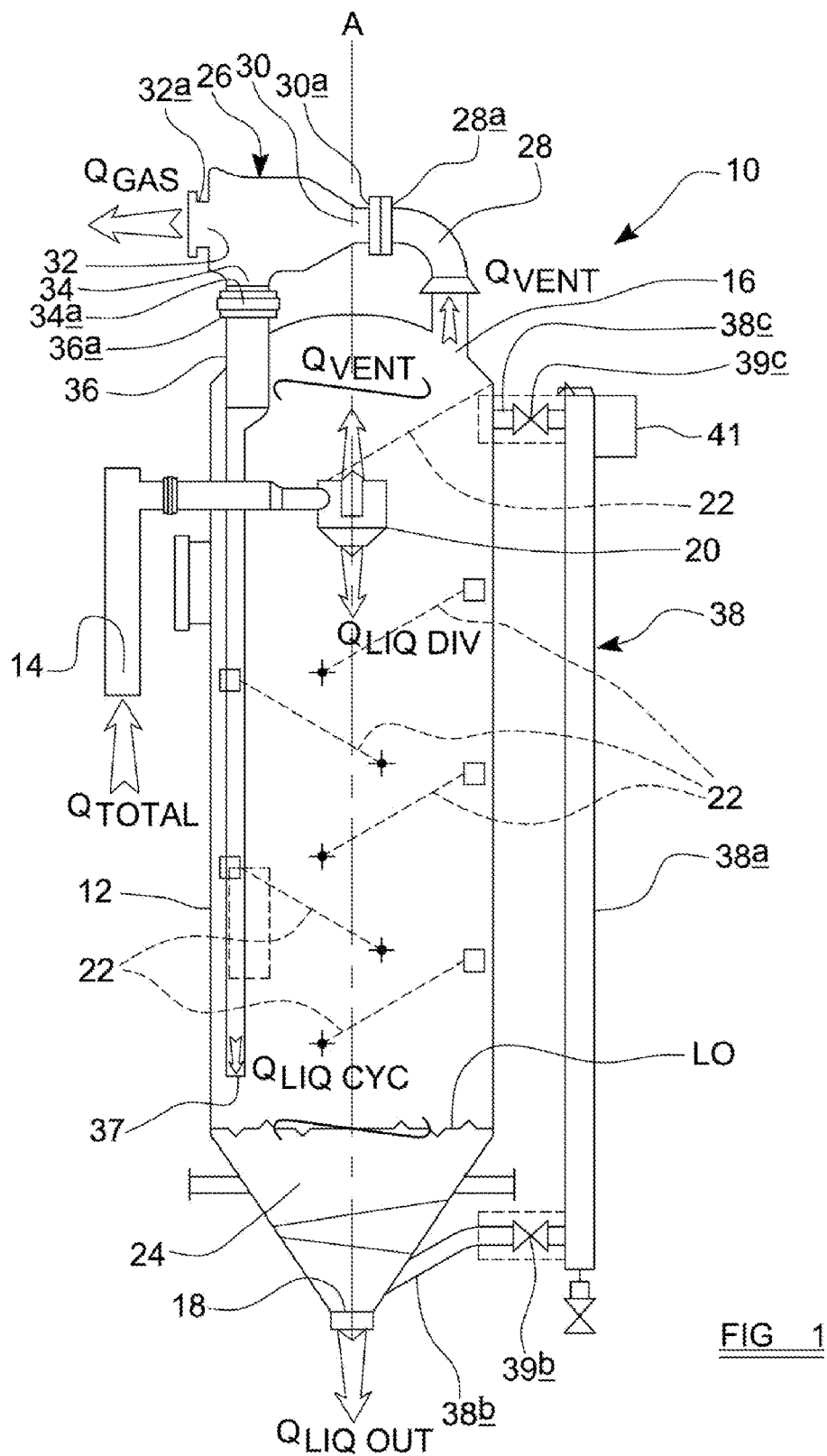

| | | |
|---|---|---|
| 3,363,404 A | 1/1968 | Griffin, III et al. |
| 3,500,943 A | 3/1970 | Bingman, Jr. |
| 3,675,713 A | 7/1972 | Watkins |
| 3,695,633 A | 10/1972 | Hanes |
| 3,895,927 A | 7/1975 | Bournham, Sr. |
| 3,910,110 A | 10/1975 | Jefferies et al. |
| 3,976,148 A | 8/1976 | Maus et al. |
| 4,010,012 A | 3/1977 | Griffin, III et al. |
| 4,059,148 A | 11/1977 | Blomsma |
| 4,098,341 A | 7/1978 | Lewis |
| 4,282,939 A | 8/1981 | Maus et al. |
| 4,326,584 A | 4/1982 | Watkins |
| 4,411,434 A | 10/1983 | Lewis |
| 4,440,239 A | 4/1984 | Evans |
| 4,444,250 A | 4/1984 | Keithahn et al. |
| 4,502,534 A | 3/1985 | Roche et al. |
| 4,527,425 A | 7/1985 | Stockton |
| 4,546,828 A | 10/1985 | Roche |
| 4,566,494 A | 1/1986 | Roche |
| 4,610,161 A | 9/1986 | Gehrig et al. |
| 4,626,135 A | 12/1986 | Roche |
| 4,666,471 A | 5/1987 | Cates |
| 4,828,024 A | 5/1989 | Roche |
| 4,832,126 A | 5/1989 | Roche |
| 4,900,445 A | 2/1990 | Flanigan et al. |
| 4,971,148 A | 11/1990 | Roche et al. |
| 5,168,932 A | 12/1992 | Worrall et al. |
| 5,178,215 A | 1/1993 | Yenulis et al. |
| 5,205,165 A | 4/1993 | Jardine et al. |
| 5,211,228 A | 5/1993 | Watkins |
| 5,224,557 A | 7/1993 | Yenulis et al. |
| 5,251,869 A | 10/1993 | Mason |
| 5,277,249 A | 1/1994 | Yenulis et al. |
| 5,279,365 A | 1/1994 | Yenulis et al. |
| 5,377,714 A | 1/1995 | Giannesini et al. |
| 5,544,672 A | 8/1996 | Payne et al. |
| 5,662,171 A | 9/1997 | Brugman et al. |
| 5,890,549 A | 4/1999 | Sprehe |
| 5,928,519 A | 7/1999 | Homan |
| 6,004,385 A | 12/1999 | Birmingham |
| 6,019,174 A | 2/2000 | Korsgaard |
| 6,035,952 A | 3/2000 | Bradfield et al. |
| 6,105,689 A | 8/2000 | McGuire et al. |
| 6,129,152 A | 10/2000 | Hosie et al. |
| 6,230,809 B1 | 5/2001 | Korsgaard |
| 6,230,824 B1 | 5/2001 | Peterman et al. |
| 6,234,258 B1 | 5/2001 | Karigan |
| 6,244,359 B1 | 6/2001 | Bridges et al. |
| 6,263,982 B1 | 7/2001 | Hannegan et al. |
| 6,276,455 B1 * | 8/2001 | Gonzalez ............ E21B 21/001 166/267 |
| 6,328,118 B1 | 12/2001 | Karigan et al. |
| 6,352,120 B1 | 3/2002 | Carbaugh |
| 6,390,114 B1 | 5/2002 | Haandrikman et al. |
| 6,413,297 B1 * | 7/2002 | Morgan ............ B01D 19/0031 95/22 |
| 6,450,262 B1 | 9/2002 | Regan |
| 7,140,441 B2 | 11/2006 | Hauge et al. |
| 7,147,788 B2 | 12/2006 | Tveiten |
| 7,314,559 B2 | 1/2008 | Hopper |
| 7,699,109 B2 | 4/2010 | May et al. |
| 7,926,560 B2 | 4/2011 | Bailey et al. |
| 7,997,345 B2 | 8/2011 | Hannegan |
| 8,973,674 B2 | 3/2015 | Leuchtenberg |
| 9,194,196 B2 | 11/2015 | Nott |
| 9,488,031 B2 | 11/2016 | Leuchtenberg et al. |
| 9,500,053 B2 | 11/2016 | Leuchtenberg |
| 9,605,504 B2 | 3/2017 | Leuchtenberg et al. |
| 2002/0074123 A1 | 6/2002 | Regan |
| 2002/0074269 A1 | 6/2002 | Hensley et al. |
| 2004/0007392 A1 | 1/2004 | Judge et al. |
| 2004/0231889 A1 | 11/2004 | Van Riet |
| 2005/0096848 A1 | 5/2005 | Hou et al. |
| 2006/0108119 A1 | 5/2006 | Bailey et al. |
| 2006/0278434 A1 | 12/2006 | Calderoni et al. |
| 2007/0095540 A1 | 5/2007 | Kozicz et al. |
| 2007/0151763 A1 | 7/2007 | Reitsma et al. |
| 2008/0105434 A1 | 5/2008 | Orbell et al. |
| 2008/0105462 A1 | 5/2008 | May et al. |
| 2008/0210471 A1 | 9/2008 | Bailey et al. |
| 2009/0101351 A1 | 4/2009 | Hannegan |
| 2009/0139724 A1 | 6/2009 | Gray et al. |
| 2010/0006299 A1 | 1/2010 | Meng |
| 2011/0100710 A1 | 5/2011 | Fossli |
| 2011/0139464 A1 | 6/2011 | Henderson et al. |
| 2011/0155388 A1 | 6/2011 | Haugland |
| 2012/0227978 A1 | 9/2012 | Fossli et al. |
| 2013/0118806 A1 | 5/2013 | Hannegan et al. |
| 2013/0168578 A1 | 7/2013 | Leuchtenberg et al. |
| 2013/0192841 A1 | 8/2013 | Feasey et al. |
| 2013/0233562 A1 | 9/2013 | Leuchtenberg |
| 2014/0138096 A1 | 5/2014 | Leuchtenberg et al. |
| 2014/0166360 A1 | 6/2014 | Vavik |
| 2015/0021045 A1 | 1/2015 | Boyd |
| 2015/0068758 A1 | 3/2015 | Leuchtenberg et al. |

FOREIGN PATENT DOCUMENTS

| | | |
|---|---|---|
| CN | 1643233 A | 7/2005 |
| CN | 1836089 A | 9/2006 |
| CN | 201330573 Y | 10/2009 |
| CN | 201358778 Y | 12/2009 |
| EP | 1 061 231 A2 | 12/2000 |
| EP | 1 659 260 A2 | 5/2006 |
| GB | 1 543 108 A | 3/1979 |
| GB | 2 349 161 A | 10/2000 |
| GB | 2 427 217 A | 12/2006 |
| GB | 2 443 561 A | 5/2008 |
| GB | 2 500 188 A | 9/2013 |
| WO | WO 97/42395 A1 | 11/1997 |
| WO | WO 98/28517 A1 | 7/1998 |
| WO | WO 99/49173 A1 | 9/1999 |
| WO | WO 99/51852 A1 | 10/1999 |
| WO | WO 01/36561 A1 | 5/2001 |
| WO | WO 2007/047800 A2 | 4/2007 |
| WO | WO 2009/123476 A1 | 10/2009 |
| WO | WO 2011/104279 A2 | 9/2011 |
| WO | WO 2011/128690 A1 | 10/2011 |
| WO | WO 2012/127227 A2 | 9/2012 |
| WO | WO 2012/143723 A2 | 10/2012 |
| WO | WO 2013/000764 A2 | 1/2013 |
| WO | WO 2013/037049 A1 | 3/2013 |
| WO | WO 2013/135694 A2 | 9/2013 |
| WO | WO 2013/135725 A2 | 9/2013 |
| WO | WO 2013/153135 A2 | 10/2013 |
| WO | WO 2015/023387 A1 | 2/2015 |

* cited by examiner

APPARATUS AND METHOD FOR DEGASSING DRILLING FLUIDS

The present invention relates to an apparatus and method for degassing drilling fluids. Particularly, but not exclusively, it relates to an improved degassing apparatus to replace a conventional mud gas separator (MGS) on a drilling rig, for use during well control or riser gas handling events.

Subsea drilling typically involves rotating a drill bit from a fixed or floating installation at the water surface or via a downhole motor at the remote end of a tubular drill string. It involves pumping a fluid down the inside of the tubular drill string, through the drill bit, and circulating this fluid continuously back to surface via the drilled space between the hole/drill string, referred to as the wellbore annulus, and the riser/drillstring, referred to as the riser annulus. The drill string extends down through the internal bore of the riser pipe and into the wellbore, with the riser connecting the subsea blow out preventer (SSBOP) on the ocean floor to the floating installation at surface, thus providing a flow conduit for the drilling fluid and cuttings returns to be returned to the surface to the rig's fluid treatment system.

Conventionally, the well bore is open to atmospheric pressure and there is no surface applied pressure or other pressure existing within the system. The drill string rotates freely without any sealing elements imposed or acting on it at the surface, and flow is diverted at atmospheric pressure back to the rig's fluid treatment and storage system. This is achieved through gravity flow from the diverter flow line outlet, through the diverter flow line, and into the fluid treatment system at surface on the rig.

The bit penetrates its way through layers of underground formations until it reaches target prospects—rocks which contain hydrocarbons at a given temperature and pressure. These hydrocarbons are contained within the pore space of the rock i.e. the void space and can contain water, oil, and gas constituents—referred to as reservoirs. Due to overburden forces from layers of rock above, these reservoir fluids are contained and trapped within the pore space at a known or unknown pressure, referred to as pore pressure. Gas can infiltrate the drilling fluid at the fluid-formation interface and dissolve into solution as the bottom hole pressure at this point in the annulus is above its bubble point. As a result the formation gas is circulated to surface in the returned fluid, and as it circulates up the annulus and the annular pressure decreases to below the gas's bubble point pressure it begins to break out of solution. The unplanned inflow of these reservoir fluids is well known in the art, and is referred to as a formation influx or kick, commonly called a well control incident or event.

As soon as an influx is detected, a procedure to close the SSBOP is initiated, but if the influx is not detected or a response initiated fast enough, hydrocarbons can escape above the SSBOP and into the riser. The infiltration of gas into the riser system creates an extremely hazardous situation, as the gas is now above the main safety barrier i.e. the SSBOP and continues to expand and increase in velocity as it migrates or circulates up the riser. This leads to the violent displacement/unloading and/or evacuation of the liquid volume from the riser. Ultimately, this could lead to an uncontrolled blow out of gas through the rig rotary table, which could be catastrophic to people, equipment and the environment as happened recently on the drilling rig 'Deepwater Horizon'.

Offshore diverters are used in conventional drilling to safely divert the flow of fluid and gas to the conventional mud gas separator (MGS) and rig's fluid treatment system degassing unit if gas manages to circulate or migrate above the SSBOP and into the riser. They are the last safety barrier present in the riser to seal off the riser annulus, and are located at the top of the riser directly below the rig rotary table. Once the diverter seals off the top of the riser, all flow from the riser is routed through either the port or starboard diverter lines which safely divert flow away from the rig floor to the conventional MGS.

Once, the SSBOP is closed to control the gas in the wellbore below it and the diverter system is used to control any gas present in the riser between the closed SSBOP and the closed diverter. Flow from the wellbore is diverted to the MGS, while generally flow from the diverter is directed overboard to safely manage gas in the riser. Alternatively, the flow of fluid and gas from the diverter flow line when the diverter packer is closed on the drillpipe during a riser gas event may also be directed to the MGS.

The wellbore fluids from below the SSBOP are circulated through the choke and kill lines, conduits which direct fluids in and out of the wellbore sealed below the SSBOP and returning to the rig's choke manifold at surface. The rig choke manifold is used in combination with the rig pumps to circulate the gas out of the wellbore from below the closed SSBOP, while controlling the bottom hole pressure (BHP) with the choke valve, returning and controlling all fluid and gas flow through the choke valve and into the rig's conventional MGS.

It is critical for the MGS to achieve a high separation efficiency to ensure all dissolved gas is removed from the returned drilling fluid to reduce the risk of it being recirculated into the well or combusting on the rig. If gasified fluid is re-injected into the well, the returning fluid allows even more gas to dissolve into solution as it circulates into the annulus due to the lighter mud column it creates within the annulus from the dissolved gas, resulting in a lower BHP and more influx into the wellbore.

The drilling fluid containing gas, liquid, and solids enters the MGS by gravity flow and circulates through a series of baffle plates which further agitate the fluid and enhance the gas breakout from the drilling fluid. Gas separates from the fluid and vents through a large diameter vent line located at the top of the MGS, while the separated fluid exits the liquid outlet at the base of the MGS.

A liquid seal or "U-tube" is present in the liquid outlet line, which provides the necessary hydrostatic pressure given its total vertical height to provide a liquid seal against the gas pressure present in the MGS from the resultant frictional pressure in the vent line from the gas flow rate. The exiting fluid then enters the rig's shaker and degassing system within the active fluid system. Thus, it is an atmospheric operating vessel, relying on gravity flow to enter the vessel and exit into the shakers.

Today, well complexities are increasing in deep and ultra-deep water wells with increasingly challenging reservoirs, such as overpressured fractured carbonates. The conventional liquid and gas design capacities of conventional MGS used offshore during well control are becoming inadequate as a result. Depending on the volume and pressure of the gas present, there is a potential risk of overloading the conventional MGS and exceeding its gas and/or liquid design capacity. In this case, generally all returned flow from the riser is diverted overboard to the ocean, resulting in environmental impacts. This also presents a high potential for filling the MGS with drilling fluid, liquid carry over into the vent line, gas blow by through the liquid outlet to the shakers, and ultimately ignition of gas escaping from the system.

Past design enhancements and features for conventional MGS are disclosed in the prior art, U.S. Pat. No. 3,241,295 discloses a MGS having various controls and valves for controlling the rate of mud flow into the vessel, U.S. Pat. No. 3,362,136 discloses a MGS where drilling fluid moves on a helical shelf into a vacuum tank, U.S. Pat. No. 3,363,404 describes a MGS and a vacuum tank with a 3-way vacuum control, and U.S. Pat. No. 3,895,927 discloses a MGS which includes baffle plates in a vacuum tank to enhance degassing.

U.S. Pat. No. 4,010,012 discloses another enhanced feature for a MGS, showing a method and system for controlling the liquid level within the MGS on the fluid outlet line by means of a level controlling valve and level indicating apparatus.

U.S. Pat. No. 6,105,689 discloses an MGS monitoring system and method which continuously monitors the conditions of the drilling fluid and gas within the MGS utilizing a series of transducers such that the drilling operation can be adjusted accordingly. The volume of gas in the drilling fluid, the hydrostatic pressure within the liquid seal and the MGS vessel pressure are measured and relayed to the operators indicating the potential hazards.

It is known to mitigate the risk of overloading a conventional atmospheric MGS by altering the diverter housing outlets and/or diverter lines, the diverter valve configuration, and the operational sequence of the valves with respect to the diverter closure. This provides an optional flow path, allowing the diverted flow from the riser to be directed to an MGS in contrast to overboard. The changes to a conventional diverter system would include an additional outlet and line below the existing outlet on the housing, or the alteration of an existing diverter line, such that flow is routed to a separate MGS coupled with liquid level and pressure sensor equipment. An interlock is used to ensure a relief flow path is opened via a valve on the diverter line before the diverter closes to prevent over-pressuring of the system. The system is strictly for degassing the riser fluid during circulation periods via gravity flow from the diverter outlet, and is not capable of handling large volumes of gas or pressurized flow from the riser during well control events. Various configurations and methodology of such a system are described in patent application WO2013/000764A2.

The present invention relates to an alternative design of MGS, referred to as the ultra-MGS or UMGS, which may replaces the existing conventional MGS used offshore in well control and riser gas events. This alternative design of MGS may provide increased liquid and gas handling capacities, reduce the risk of overloading the MGS, and ultimately enhance the safety of the rig.

According to a first aspect of the invention we provide an apparatus for degassing drilling fluid comprising a primary separator and a secondary separator, the primary separator comprising a vessel body having an inlet port, a liquid outlet port located at a lower end of the vessel body, and a gas vent port located at an upper end of the vessel body, the secondary separator having an inlet port which is connected to the gas vent port of the primary separator, a gas outlet port, and a liquid outlet port which is connected to the interior of the vessel body of the primary separator via a liquid return line.

The primary separator preferably includes a plurality of baffles which are located in the vessel body below the inlet port so that liquid entering the vessel body via the inlet port flows over the baffles as it descends down the vessel body.

The inlet of the primary separator may be provided with a primary diverter assembly which splits the incoming fluid into a lower density stream which is predominantly gas with entrained solids and liquids, and a higher density liquid stream which is predominantly liquid with entrained gas and solids.

The inlet of the primary separator is located in an upper region of the vessel body.

The primary separator may be further provided with a liquid seal which is connected to the liquid outlet port. The liquid seal may comprise a generally U-shaped pipe.

The primary separator may be provided with a liquid level sensing system which is operable to provide an indication of the surface level of liquid collected in the bottom of the vessel body. The liquid level sensing system may comprise a generally vertical pipe, the bottom of which is connected to the interior of the vessel body by means of a port in a lower portion of the vessel body, and a liquid level sensor which is mounted on the vertical pipe and is operable to provide an indication of the liquid level in the vertical pipe. The liquid level sensing system may comprise a radar level sensor.

The secondary separator may comprise a cyclone separator which has a housing which is configured to divert the flow of a gas stream entering the housing via the inlet of the cyclone separator so that flows in a generally circular flow path around a vortex chamber within the housing. In this case, the cyclone separator may include at least one deflector vane which extends from the housing into the interior of the housing. The inlet and gas outlet port of the cyclone separator may be arranged along a longitudinal axis of the secondary separator, whilst the liquid outlet port is provided in a portion of the housing which extends generally parallel to the longitudinal axis of the secondary separator. The housing of the cyclone separator preferably encloses a space with a generally circular transverse cross-section.

The liquid return line may extend down the interior of the vessel body to end at a point in the lowermost portion of the vessel body.

According to a second aspect of the invention we provide a drilling system including an apparatus for degassing drilling fluid according to the first aspect of the invention wherein the drilling system includes a riser which extends between a subsea blowout preventer mounted on a wellhead at the top of a wellbore, and a diverter which has a returns port which is connected to the inlet of the primary separator via a returns line, the returns line containing a diversion flow valve which is operable to permit or substantially prevent flow of fluid from the returns line to the primary separator.

The drilling system may also be provided with a drilling fluid reservoir and the liquid outlet port of the primary separator may be connected to the drilling fluid reservoir via a liquid seal.

A liquid level control valve may be provided in a line between the liquid seal and the drilling fluid reservoir, the liquid level control valve being operable to stop, or restrict to a variable extent, flow of fluid from the liquid outlet of the primary separator to the drilling fluid reservoir.

The drilling system may further include a shaker and/or centrifuge/degasser system through which all fluid flows before entering the drilling fluid reservoir.

The drilling system may also include an overboard diversion line which extends from the returns line to a discharge point where riser fluid may be discharged relatively safely. An overboard diverter valve may be provided in the overboard diversion line, the overboard diverter valve being operable to either permit or substantially prevent flow of fluid along the overboard diversion line.

A further overboard diversion line may extend from the liquid seal to a further discharge point wherein fluid from the primary separator may be discharged relatively safely. A further overboard discharge valve may be provided in the further overboard diversion line, the further overboard discharge valve being operable to either permit or substantially prevent flow of fluid along the further overboard diversion line.

The returns line may also be connected directly to the drilling fluid reservoir via a main diverter flow line, the main diverter flow line including a diverter valve which is operable to either permit or substantially prevent flow of fluid from the returns line directly to the drilling fluid reservoir.

The drilling system may further include a rig choke and kill manifold which is connected to a wellbore annulus below the subsea BOP via a well control choke line, the choke and kill manifold being, in turn, connected to the inlet of the primary separator via a choke valve which is operable to either permit or substantially prevent flow of fluid from the choke and kill manifold to the inlet of the primary separator.

According to a third aspect of the invention we provide a drilling system including a separator apparatus for degassing drilling fluid, a riser which extends between a subsea blowout preventer mounted on a wellhead at the top of a wellbore, and a diverter which has a returns port which is connected to an inlet of the separator apparatus via a returns line, and a rig choke and kill manifold which is connected to a wellbore annulus below the subsea blowout preventer via a well control choke line, the choke and kill manifold being, in turn, connected to the inlet of the separator apparatus via a choke valve which is operable to either permit or substantially prevent flow of fluid from the choke and kill manifold to the inlet of the primary separator.

The separator apparatus may have any of the features or any combination of the features of the apparatus according to the first aspect of the invention.

Preferably, the returns line contains a diversion flow valve which is operable to permit or substantially prevent flow of fluid from the returns line to the separator apparatus.

The drilling system may also be provided with a drilling fluid reservoir and a liquid outlet port of the separator apparatus may be connected to the drilling fluid reservoir via a liquid seal.

A liquid level control valve may be provided in a line between the liquid seal and the drilling fluid reservoir, the liquid level control valve being operable to stop, or restrict to a variable extent, flow of fluid from the liquid outlet of the primary separator to the drilling fluid reservoir.

The drilling system may further include a shaker and/or centrifuge/degasser system through which all fluid flows before entering the drilling fluid reservoir.

The drilling system may also include an overboard diversion line which extends from the returns line to a discharge point where riser fluid may be discharged relatively safely. An overboard diverter valve may be provided in the overboard diversion line, the overboard diverter valve being operable to either permit or substantially prevent flow of fluid along the overboard diversion line.

A further overboard diversion line may extend from the liquid seal to a further discharge point wherein fluid from the primary separator may be discharged relatively safely. A further overboard discharge valve may be provided in the further overboard diversion line, the further overboard discharge valve being operable to either permit or substantially prevent flow of fluid along the further overboard diversion line.

The returns line may also be connected directly to the drilling fluid reservoir via a main diverter flow line, the main diverter flow line including a diverter valve which is operable to either permit or substantially prevent flow of fluid from the returns line directly to the drilling fluid reservoir.

According to a fourth aspect of the invention we provide a method of operating a drilling system including a separator comprising a vessel body having an inlet port, a liquid outlet port located at a lower end of the vessel body, a liquid level control valve operable to control or prevent flow of fluid out of the vessel body through the liquid outlet port, a gas vent port located at an upper end of the vessel body, and a liquid level sensing system which is operable to provide an output representing the surface level of liquid collected in the bottom of the vessel body, the method including closing the liquid level control valve and monitoring the output from the liquid level sensing system to determine the rate of change in liquid level in the vessel body over time, and using this to monitor the flow rate of fluid into the vessel body over time to determine the flow rate trend over time.

The method may further include using the liquid level control valve automatically to regulate the liquid level in the separator when a hazardous flow rate trend is detected. One example may be during a flow check (a known industry well control procedure) where the liquid level sensing system can decipher between flow from the release of trapped pressure or wellbore breathing as opposed to a hazardous source such as gas, underbalance or the mud pumps and/or riser booster pumps inappropriately left on. The release of trapped pressure or wellbore breathing may be indicated by a decrease in flow rate over time. Contrastingly, a stable to increasing flow rate trend over time can indicate a hazardous source.

The method may further include the step of initiating an alert procedure if the liquid level sensing system detects that the liquid level has exceeded a predetermined level. Thus, the HLI sensor would still protect the UMGS if flow from an unsafe source was not detected triggering either the liquid level control valve to commence regulating the fluid level in the vessel or discharging flow overboard before reaching the vessel. In either case, the rig crew would also be alerted to the presence of hazardous flow.

The liquid level sensing system may comprise a generally vertical pipe, the bottom of which is connected to the interior of the vessel body by means of a port in a lower portion of the vessel body, and a liquid level sensor which is mounted on the vertical pipe and is operable to provide an indication of the liquid level in the vertical pipe. The liquid level sensing system may comprise a radar level sensor, or other suitably sensitive level sensing device.

The drilling system may also be provided with a drilling fluid reservoir and the liquid outlet port of the separator may be connected to the drilling fluid reservoir via a liquid seal. The liquid seal may comprise a generally U-shaped pipe.

The liquid level control valve may be provided in a line between the liquid seal and the drilling fluid reservoir, the liquid level control valve being operable to stop, or restrict to a variable extent, flow of fluid from the liquid outlet of the primary separator to the drilling fluid reservoir.

The separator may include a plurality of baffles which are located in the vessel body below the inlet port so that liquid entering the vessel body via the inlet port flows over the baffles as it descends down the vessel body.

The inlet of the separator may be provided with a primary diverter assembly which splits the incoming fluid into a lower density stream which is predominantly gas with entrained solids and liquids, and a higher density liquid stream which is predominantly liquid with entrained gas and solids.

The inlet of the primary separator may be located in an upper region of the vessel body.

The drilling system may have any of the features or combination of features of the drilling system according to the second aspect of the invention.

Figure 2:
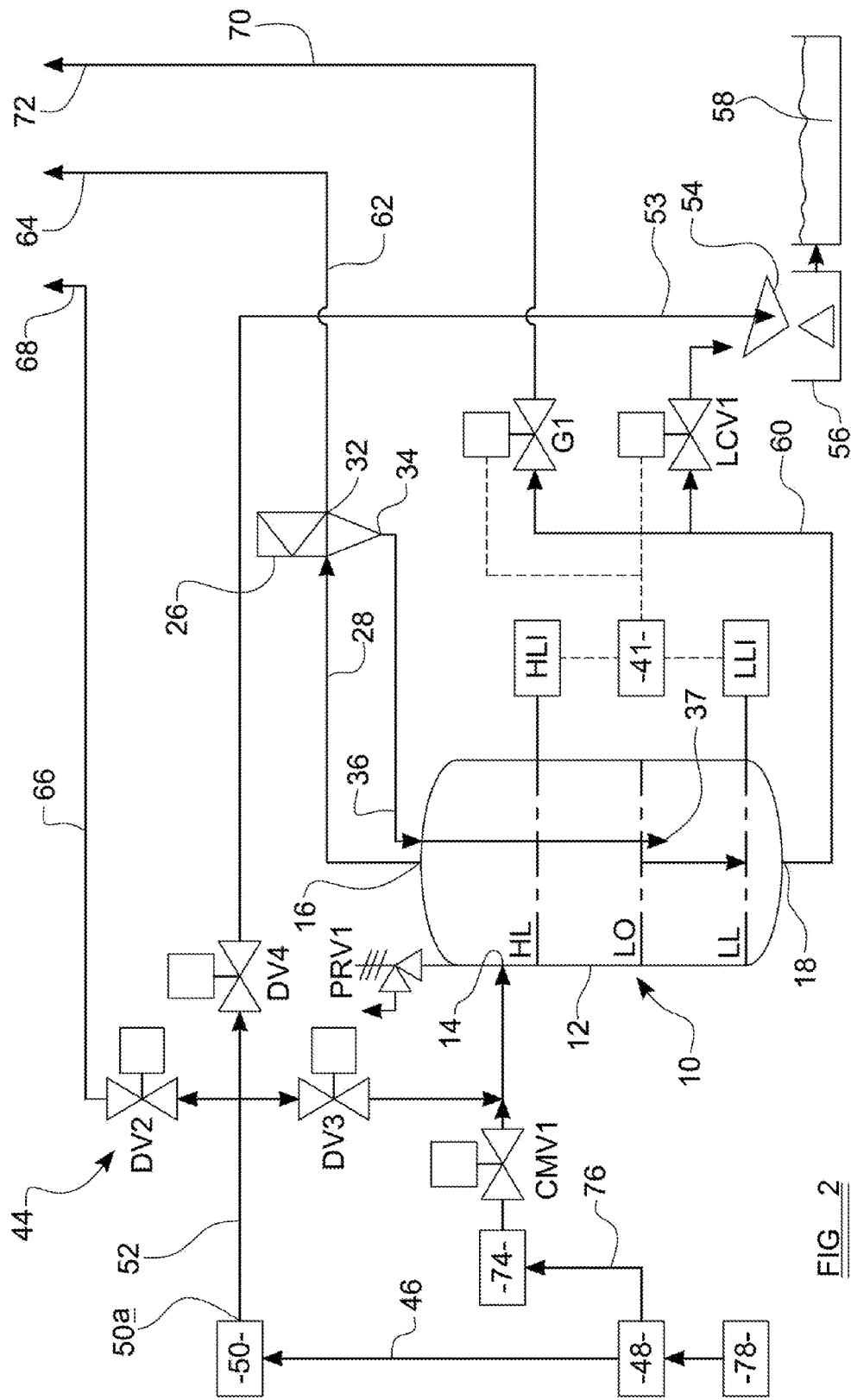
Figure 3:
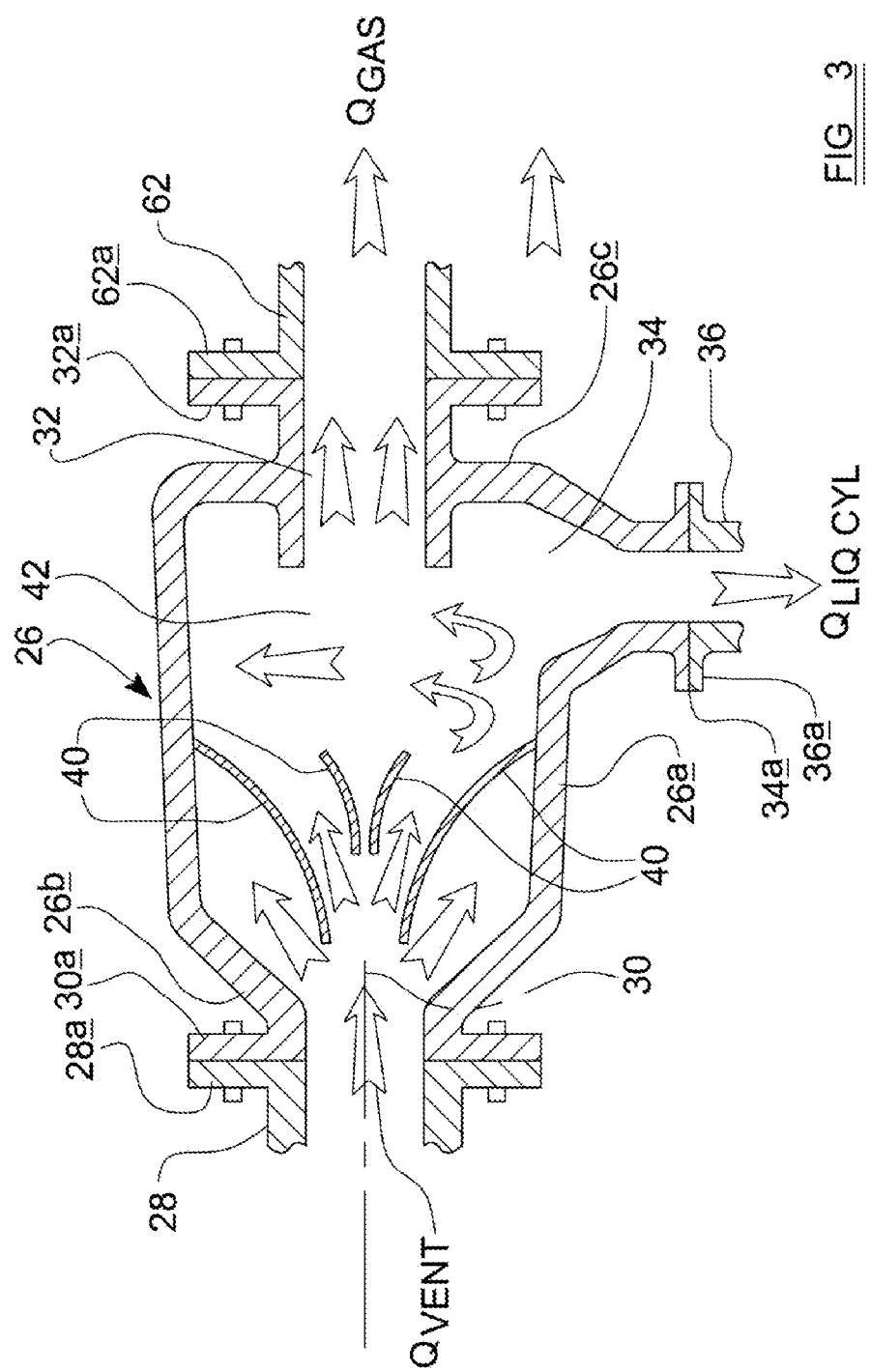
Figure 4:
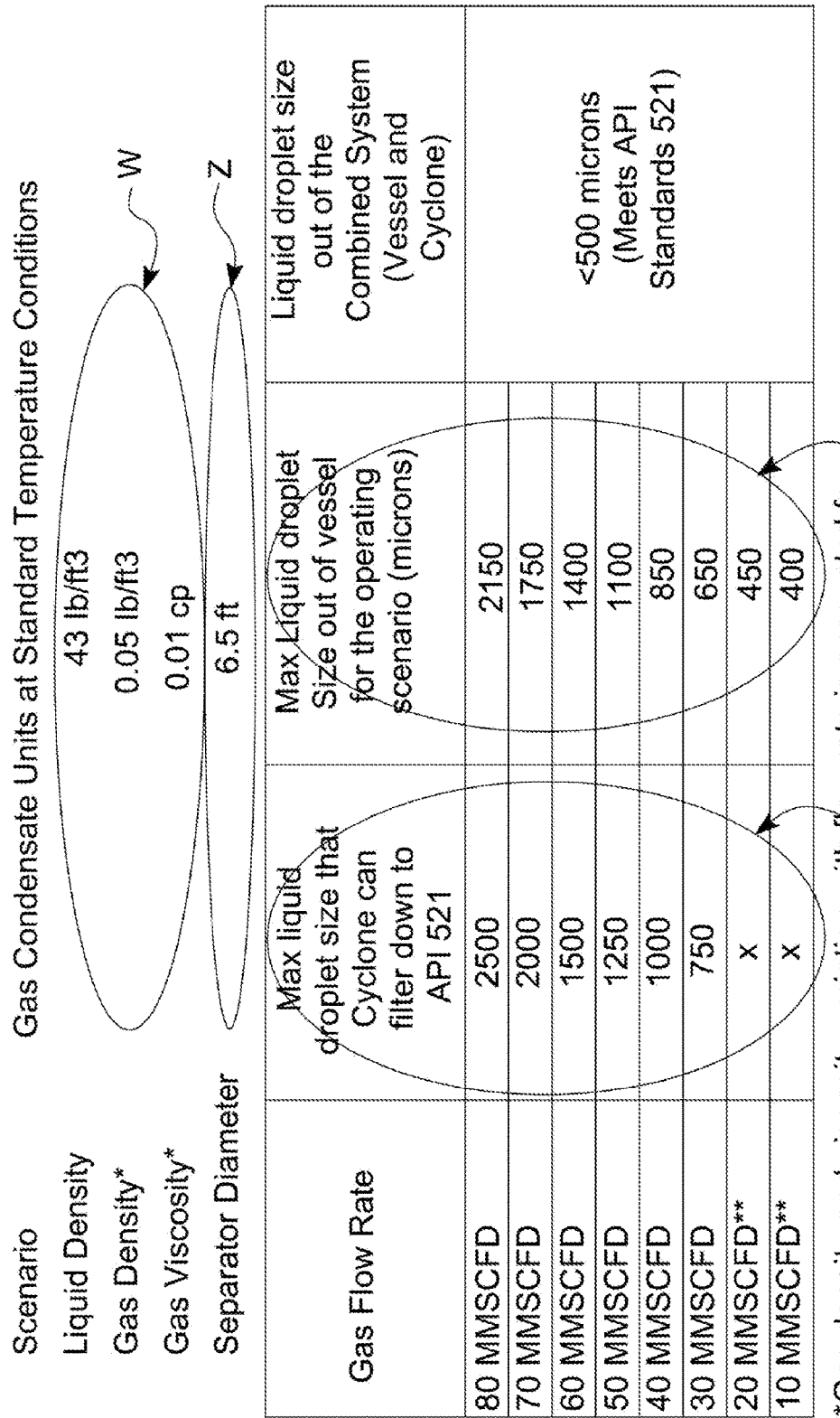

An embodiment of the invention will now be described with reference to the accompanying drawings of which FIG. 1 is a schematic illustration of an apparatus for degassing drilling fluid according to the first aspect of the invention, FIG. 2 is a schematic illustration of a drilling system including the apparatus illustrated in FIG. 1, FIG. 3 shows an illustration of a longitudinal cross-section through the cyclone separator of the apparatus illustrated in FIG. 1, and FIG. 4 shows a table illustrating the relationship between the gas flow rate into the apparatus illustrated in FIG. 1, and the resulting liquid droplet size for a given apparatus internal diameter.

Referring now to FIG. 1, there is shown an apparatus for degassing drilling fluid, hereinafter referred to as the UMGS (ultra-mud gas separator) 10. The apparatus comprises a primary separator which has a vessel body 12 with a drilling fluid returns inlet 14, a means for monitoring and controlling the liquid level inside the vessel body 12, a gas outlet or "vent" port 16, and a drilling fluid liquid outlet port 18. The drilling fluid returns inlet 14 is located towards an upper end of the vessel body 12 so that the drilling fluid containing dissolved or separate gas volume enters the vessel body 12 at a higher elevation than the minimum fluid level in the vessel body 12. The vent port 16 is located at the top of the vessel body, whilst drilling fluid liquid outlet port 18 is located at the bottom. In this embodiment, the bottom of the vessel body 12 has an inverted frusto-conical shape, and the liquid outlet port 18 is located at the lowest part.

The drilling fluid returns inlet 14 is connected to a primary inlet diverter assembly 20 which is located within the vessel body 12 in the upper half of the vessel body 12 and, horizontally, generally centrally, in this example, so that it lies on a longitudinal axis A of the vessel body 12. The vessel body 12 is typically oriented, in use, so that its longitudinal axis A is generally vertical.

The primary diverter assembly 20 has a chamber, and is configured such that when incoming flow stream $Q_{TOTAL}$ enters the drilling fluid returns inlet 14, a centrifugal effect generated in the chamber of the preliminary diverter assembly 20 separates the incoming flow stream $Q_{TOTAL}$ into two separate flow streams—$Q_{VENT}$ a less dense flow stream containing mostly gas with entrained droplets of fluid and solids of various sizes, and $Q_{LIQ\_DIV}$ a denser flow stream containing mostly liquid and solids with potentially small bubbles of entrained gas.

In the vertical space between the drilling fluid returns inlet 14 and the fluid level are located a series of baffle plates 22 which further agitate the fluid, to further release gas from the fluid, as it flows and falls through the interior of the vessel body 12.

In one embodiment, the baffle plates 22 each comprise at least a sheet which is oriented at an angle of less than 90° to the vertical (around 45° in this example), so that the edge of each baffle plate 22 which is closest to the vessel body 12 is higher than an opposite edge of the baffle plate 22 which located close to the longitudinal axis A of the vessel body 12.

The baffle plates 22 are arranged in a herring-bone pattern extending from alternating sides of the vessel body 12. This invention is not restricted to this particular arrangement of baffle plates however, and various other suitable arrangements are known to persons of skill in the art from existing MGS apparatus.

As $Q_{LIQ\_DIV}$ flows vertically downwards in the vessel body 12, it passes through the series of baffle plates 22, and these increases both the separation contact area and retention time of the fluid stream $Q_{LIQ\_DIV}$ to enhance the gas separation process. $Q_{LIQ\_DIV}$ then flows into an operating liquid volume 24 (which has a surface level labelled L0 in FIG. 1) in the bottom portion of the vessel body 12. The liquid, now separated from the gas, flows through the drilling fluid liquid outlet port 18 located at the bottom of the vessel body 12.

A pressure relief valve PRV1 (shown only in FIG. 2) is provided at the top of the vessel body 12. This is configured to open, and direct fluid from the vessel body 12 overboard, if the pressure in the vessel body exceeds a predetermined level.

As mentioned above, the UMGS 10 is also provided with means for monitoring and controlling the liquid level inside the vessel body 12. In this example, the means for monitoring the liquid level is provided by means of a conventional bridle arrangement 38. This comprises a generally vertical pipe 38a which is mounted externally of the vessel body 12, but which is connected to the interior of the vessel body 12 by means of a bottom connector pipe 38b and a top overflow connector pipe 38c. The bottom connector pipe 38b extends from a port in a bottom portion of the vessel body 12 to the bottom end of the vertical pipe 38a. The top overflow connector pipe 38c extends from the top of the vertical pipe 38a to a port in an upper region of the vessel body 12, significantly higher than the normal liquid level L0. A valve 39b, 39c is provided in each of the connector pipes 38b, 38c. Both of these valves are open in normal use, and it will be appreciated that, as a result, the liquid level in the vertical pipe 38a will be the same as the liquid level in the vessel body 12.

A liquid level sensor 41 is coupled to the top of the vertical pipe 38a to measure the level of the liquid in the vertical pipe 38a. The liquid level sensor may, for example, be a radar level sensor, which is a highly accurate level sensor with a two loop wired radar gauge using non-contact microwave level transmitter technology. It may feature a "false echo" system capable of distinguishing unwanted static and moving reflections.

The liquid level sensor 41 is advantageously connected to a central control and processing unit (not shown), so that the liquid level L0 can be monitored, and action taken if the fluid level L0 increases and starts to come close to the primary inlet diverter assembly 20. Thus, the possibility of flooding the vessel body 12, potentially resulting in liquid carry over into the vent line can be avoided. The real-time liquid level measurement can also be used to prevent the liquid level L0 from dropping to below a specified set point to avoid evacuating the liquid seal (not shown), potentially resulting in gas blow by to the shakers. For example, as shown in FIG. 2, the liquid level sensor may be provided with level indicator switches, LLI and HLI, to detect the change in the operating fluid level L0 to maximum and minimum allowable levels of HL and LL (HL being just below the primary inlet diverter assembly 20, and LL being close to, but just above the very bottom of the vessel body 12). Suitable level indicator switches are well known in the art.

The features of the UMGS 10 described in the figures thus far have each been present on a conventional mud gas separator However, in one embodiment of the invention, the UMGS differs from the prior art in that it also includes a secondary separator for separating entrained liquid particles from a gas stream. The secondary separate has an inlet port 30 which is connected to the gas vent port 16 of the primary separator, a gas outlet port 32 and a liquid outlet port 34 which is connected to the interior of the vessel body 12 of the primary separator via a liquid return line 36. In this embodiment, the secondary separating apparatus is a cyclone separator 26 which connected to the vent port 16 via a vent line 28 directly on top of the vessel body. Both the vent line 28 and cyclone separator 26 are external to the vessel body 12.

The cyclone separator 26 is illustrated in more detail in FIG. 3, and, in this example, comprises a high efficiency knockout gas cyclone. The cyclone separator 26 has a side wall 26a which extends between a first end 26b and a second end 26c, so that the cyclone separator 26 has a generally circular transverse cross-section (i.e. normal to its longitudinal axis), the transverse cross-section increasing in diameter from the first end 26b to the second end 26c.

The first end of the cyclone separator 26 is provided with the cyclone inlet port 30 which has a flanged connection portion 30a which is secured, typically by means of fasteners such as bolts, to a corresponding flanged connection portion 28a on the vent line 28, so a to provide a substantially fluid tight seal between the cyclone separator 26 and the vent line 28. At the second, opposite, end 26c of the cyclone separator 26 there is the cyclone gas outlet port 32 which is also provided with a flanged connection portion 32a. The centres of the cyclone inlet 30 and cyclone gas outlet port 32 both lie on the longitudinal axis of the cyclone separator 26.

The cyclone separator 26 is also provided with a further outlet port—the cyclone liquid outlet port 34 which is provided in the side wall 26a of the cyclone separator 26 adjacent the second end 26c. The cyclone liquid outlet port 34 also has a flanged connection portion 34a, which is secured to corresponding flanged connection portion 36a of a liquid return line 36, typically by means of fasteners such as bolts, so as to provide a substantially fluid tight seal between the cyclone separator 26 and the liquid return line 36. The liquid return line 36 extends into the vessel body 12 via a port at the top of the vessel body 12, and continues to extend down the interior of the vessel body 12 to a point 37 at around the surface level L0 of the operating liquid volume 24 at the bottom of the vessel body 12.

Inside the cyclone separator 26, adjacent the cyclone inlet port 30, there are coned deflector vanes 40 that are designed to withstand the large impact loads of the flow stream $Q_{VENT}$. There is a space between the deflector vanes 40 and the cyclone gas outlet port 32 which is designated the vortex chamber 42.

The gas and fluid/solids entrained flow stream $Q_{VENT}$ exits the UMGS vessel body 12 through the vent port 16 and into the large diameter vent line 28, and enters the inlet 30 of the cyclone separator 26. Here, the inlet flow stream $Q_{VENT}$ is split, by the deflector vanes 40 into several streams, and the flow streams proceed to enter the vortex chamber 42 oriented tangentially to the deflector vanes 40, subjecting the flow streams to a powerful centrifugal force. As a result, the liquid and solid particles of the incoming flow stream $Q_{VENT}$ are forced to the cyclone side wall 26a, and the denser flow stream $Q_{LIQ\ CYC}$ containing these particles exits the cyclone separator 26 via the cyclone liquid outlet port 34, providing a clean dry gas stream $Q_{GAS}$ at the cyclone gas outlet port 32.

It should be appreciated, however, that the secondary separator doesn't have to be configured in this way, for example, the secondary separator need not be provided with deflector vanes, and may be the type of cyclone separator in which the fluid flow in to the separator is tangential. Such cyclone separators are known, and in these prior art cyclone separators the port 34 is the inlet port, and the port 30 is the liquid outlet port. Whilst entirely suited for this application, it should be appreciated that a cyclone separator need not be used, and any secondary separation device that has a high enough separation quality could be used.

Referring now to FIG. 2, this shows how the UMGS 10 described above can be integrated into a control and drilling system.

The drilling system includes a riser 46 which extends between an SSBOP 48 mounted on a wellhead at the top of a wellbore, and diverter 50. During drilling a drill string (not shown) extends along the riser, through the SSBOP 48 and into well bore (not shown). The diverter 50 has a returns port 50a which is connected to returns line 52, and is operable to close around the drill string to contain fluid pressure in the riser annulus when required (during a well control operation, for example). The drilling fluid returns inlet 14 of the UMGS 10 is connected to the returns line 52 via an UMGS diversion flow valve DV3 which is operable to permit or substantially prevent flow of fluid from the returns line 52 to the UMGS 10.

The drilling system is also provided with a conventional shaker 54 and degasser and centrifuge system 56, from which, recovered and cleaned drilling fluid may be returned to reservoir of drilling fluid (mud pits) 58. The drilling fluid liquid outlet port 18 of the UMGS 10 is connected to the shaker 54 and degasser and centrifuge system 56 via a liquid seal 60 as in conventional MGS systems. A liquid level control valve LCV1 is provided in the line between the liquid seal 60 and the shaker 54, and is operable to stop, or restrict to a variable extent, flow of fluid from the UMGS 10 to the shaker 54.

The cyclone gas outlet port 32 has a flanged connection portion 32a which is secured to corresponding flanged connection portion 62a of UMGS vent line 62, typically by means of fasteners such as bolts, so as to provide a substantially fluid tight seal between the cyclone separator 26 and the UMGS vent line 62. The UMGS vent line 62 extends to a vent point 64 near the top of the rig's mast structure, where the gas contained therein may be exhausted to the atmosphere.

The UMGS 10 replaces the conventional MGS used for well control and riser gas events, and still operates as an atmospheric vessel. It therefore requires its drilling fluid returns inlet 14 to be at a lower elevation than the returns port 50a in the diverter 50. Moreover, the liquid outlet elevation at the top of the U-tube/liquid seal 60 must be higher than the elevation of the inlet to the shaker 54. This is to assist the gravity flow in and out of the vessel body 12, which is necessary for its effective atmospheric operation.

In this embodiment, the drilling system 44 also includes an overboard diversion line 66 which extends from the returns line 52 to a discharge point 68 where riser fluid may be discharged overboard relatively safely. An overboard diverter valve DV2 is provided in the overboard diversion line 66 and is operable to either permit or substantially prevent flow of fluid along the overboard diversion line 66.

A further overboard diversion line, UMGS overboard diversion line 70 extends from the liquid seal 60 of the UMGS 10 to a further discharge point 72 wherein fluid from the UMGS may be discharged overboard relatively safely. A UMGS overboard discharge valve G1 is provided in the UMGS overboard diversion line 70 and is operable to either permit or substantially prevent flow of fluid along the UMGS overboard diversion line 70.

The returns line 52 is also connected directed to the shaker 54 via a main diverter flow line 53 and diverter valve DV4 which is operable to either permit or substantially prevent flow of fluid from the returns line 52 directly to the shaker 54, and degasser and centrifuge system 56.

Although not essential, in this embodiment, the drilling system 44 further includes a rig choke and kill manifold 74 which is connected to the annulus below the SSBOP 48 via a conventional well control choke line 76. The choke and kill manifold 74 is, in turn, connected to the drilling fluid returns inlet 14 of the UMGS 10 via a choke valve CMV1 which is operable to either permit or substantially prevent flow of fluid from the choke and kill manifold to the drilling fluid returns inlet 14.

The diametrical sizing of the inlet 14, outlet 18, and vent port 16 of the UMGS 10 is increased in combination with the vessel size/volume to enhance separation efficiency and greatly increase the liquid surge and gas capacity of the UMGS 10 when compared to conventional drilling MGS. The drilling fluid returns inlet 14 of the UMGS 10 may be as large as 12 inches in diameter. The drilling fluid liquid outlet port 18 and liquid seal 60 may be as large as 14 inches in diameter. The diameter of the gas outlet port 16 and vent line 28 may be as large as 16 inches. The cyclone liquid outlet port 34 and liquid return line 36 may be as large as 12 inches in diameter. It should be appreciated, however, that these sizes are given by way of example only, and the diameters may be greater or less than the examples given.

The use of an additional, secondary separator 26 allows the internal diameter (ID) of the UMGS vessel body 12 to be altered, such that minimal dimensional design sizing is achieved, without compromising separation efficiency under atmospheric conditions. This decreases the footprint required on the rig with respect to its base area and weight, allowing the constraints with the rig's deck area and loads to be satisfied more easily.

In particular, the enhanced separation features of the secondary separator 26 result in flexibility in the ID of the vessel body 12. The ID of the vessel body 12 increases the internal volume and hence, the retention time within the UMGS 10 required to effectively break out all of the gas from the inlet flow stream $Q_{TOTAL}$. Generally, the retention time and entrained fluid particle size parameters for any given MGS are governed by the American Petroleum Institute (API) guidelines. API RP 521 specifies a maximum entrained droplet size of 600 microns is to be achieved in the vented gas stream, and deems this an effective droplet size separation within a vertical vessel. An entrained droplet size beyond this results in the larger entrained particles being carried within the gas flow stream which may lead to an unsafe volume and droplet size of liquid released at the vent line exit. API RP 521 also recommends a retention time for two phase separation in vertical vessels is at least one minute.

The centripetal forces exerted on the fluid while travelling through the cyclone separator 26 cause the larger liquid droplets to drop out of the gas stream only permitting liquid droplets that are below the API standard of 600 microns to travel up the vent line for a wide range conditions that may be experienced in well control event. This is achievable through the cyclone separator 26's internal vanes and vortex chamber which causes the liquid to spin while travelling through the system. Therefore, the UMGS inlet flow stream $Q_{VENT}$ to the cyclone separator 26 can exceed a 600 micron entrained droplet size because any entrained droplets carried into the vent line with the exiting flow stream $Q_{VENT}$ are separated from the mixture with the enhanced separation feature of the cyclone separator 26. An added advantage of the cyclone separator 26 is that the cross-sectional area through the system may be greater than the cross sectional area of the flow line allowing for this separation to take place with a negligible amount of back pressure on the vessel body 12.

A static model has been generated for the sizing of the UMGS 10 which takes into consideration the enhanced separation effects of the cyclone separator 26, and its inputs, outputs, and method are illustrated in FIG. 4. Ultimately a sensitivity analysis tool for sizing the vessel body 12, and includes the cyclone separator 26 in the analysis which allows the vessel ID to be decreased further while still meeting the separation requirements. The cyclone separator 26 works best at higher flow rates because it can create spin at a higher velocity. At low flow rates, the cyclone separator 26 does not work so well. However, this is not a concern because the primary separator would be sized sufficiently to conduct separation to API standards without the secondary separator during low gas flow rates. The primary separator can operate with high separation efficiency at low rates because gas travels through the vessel more slowly allowing ample time for gravity to force liquid droplets to fall out of the gas stream. At higher flow rates, the assistance of centripetal forces from the cyclone separator 26 is needed to separate out the smallest flow rates as they could be travelling through the primary separator too quickly for the desired separation to happen. As such, the advantage of the cyclone separator is most evident at higher gas flow rates. The model pairs the cyclone separator 26 and the UMGS vessel body 12 in its analysis and illustrates their relationship to a varied entrained droplet size.

A smaller UMGS vessel body 12 cannot be used to manage larger inlet flow streams while meeting API guidelines without the addition of the cyclone separator 26, and therefore a minimum vessel ID can be achieved using this model. Knowing the capability of the cyclone separator 26, the user can increase the liquid droplet size requirement in an attempt to reduce the ID beyond what was previously possible. The model reveals that a smaller UMGS ID is achievable with the support of the cyclone separator 26.

To do this, the model combines a calculation of the volumetric flow rate and fluid properties of the mud and gas at separator conditions with both the API RP 521 recommended process for vessel ID sizing and an analysis of the cyclone filtration performance. The analysis of cyclone filtration performance will inform the vessel designer of the range of scenarios over which the cyclone separator 26 can filter significantly sized liquid droplets down to the API requirement of 600 microns. With this information in hand, a vessel designer can move forward to determine the smallest vessel ID that will not result in an operating scenario that exceeds the capability of the cyclone to meet API standards. The vessel designer can also determine the operating boundaries of the system in terms of fluid properties and maximum flow rate that may travel through the vessel and cyclone that can still meet the API filtration requirements for a given vessel ID.

An example of the analysis that may be performed to justify the enhanced filtration capability of the UMGS with the combination of a vessel body 12 and cyclone separator 26 is shown for a 6.5' vessel ID. The properties of the gas and liquid phase as well as the gas volumetric flow rate in concern at standard temperature pressure conditions are shown in W. The fluid properties and volumetric flow rate change with the temperature and pressure in the vessel during operation. The selected vessel diameter of 6.5' is shown in Z. The maximum liquid droplet size that the cyclone separator 26 can accept and filter down to below 600 microns is shown in X for a given scenario. The maximum liquid droplet that is calculated to exit the vessel body in $Q_{VENT}$ for a given scenario is shown in Y. Since X is greater than Y for the scenarios analysed, FIG. 2 effectively shows that a 6.5' vessel ID is sufficient in combination with a cyclone separator 26 to meet API standards at the flow rate and fluid properties analysed. FIG. 4 also shows that without the cyclone separator 26, a 6.5' vessel ID is not physically capable of achieving the API standard for the scenarios considered, hence the necessity of using the cyclone separator 26 too.

The drilling system may be operated as follows.

During conventional drilling, the drilling returns from the wellbore annulus 78 circulate up through the SSBOP 48 and into the riser annulus until they are diverted through the returns port 50a of the diverter 50 at the top of the riser 46. All flow is diverted to the main diverter flow line 53 by opening diverter valve DV4, and closing the overboard diverter valve DV2 and UMGS flow diversion valve DV3. Conventionally, all returned fluid from the wellbore and riser flows through the main diverter flow line 53 and into the rig's shaker 54 and degasser and centrifuge system 56, and returns to the active fluid storage volume (mud pits) 58.

When a riser gas event is detected, the SSBOP 48 and diverter 50 are closed. The operator can then select from two main flow paths for the returning fluid from the riser 46.

If it is anticipated the gas volume and pressure could potentially exceed the design capacity of the UMGS 16, all flow from the riser is directed to the overboard diversion line 66, dispersing the gas at either the port or starboard side of the rig. To achieve this, overboard diverter valve DV2 is opened to the overboard diversion line 66, and the main diverter flow line valve DV4 is closed before the diverter 50 is closed.

Alternatively, all flow from the riser 46 may be diverted to the UMGS 10.

UMGS flow diversion valve DV3 is opened and the diverter valve DV4 in the main diverter flow line 53 is closed before the diverter 50 is closed. The diverted flow enters the UMGS 10 at drilling fluid returns inlet 14, and contains gas, solids and fluids. These enter the primary inlet diverter assembly 20, described herein, which is the initial separation mechanism of the fluids and solids from the gas stream. Gas containing entrained fluid and solids particles exits the gas vent port 16 and into the cyclone inlet 30.

An enhanced separation process occurs within the cyclone separator 26 as described above. The low density gas stream exits the cyclone separator 26 via the cyclone gas outlet port 32, and is directed to the UMGS vent line 62, dispersing the gas to the atmosphere at the UMGS vent point 64 near the top of the rig's mast structure. The higher density liquid and solids stream exits the cyclone separator 26 through the cyclone liquid outlet port 34, and passes into the liquid return line 36. From there, it flows into the vessel body 12 at the liquid return point 37 at around operating fluid level L0, where the required retention time is achieved before the liquid exits the UMGS 10 through the drilling liquid outlet port 18. The liquid/solids mixture then passes through the liquid seal/U-tube 60, and is returned to the shakers 54 in a fully degassed state.

On detection of a well control event, such as a formation influx into the wellbore, the SSBOP 48 is closed immediately. All flow from the wellbore annulus 78 isolated beneath the closed SSBOP 48 can be diverted to the conventional well control choke line 76 and into the rig choke and kill manifold 74. To do this, the UMGS flow diversion valve DV3 is closed before opening the choke valve CMV1 to initiate circulation of the wellbore fluid from the wellbore annulus 78 to the UMGS 10 through the rig's choke and kill manifold 74. CMV1 is used to control the BHP in the wellbore annulus 78 during the removal of the gas influx from the well. The diverted flow then enters the UMGS 10 and is degassed in exactly the same way as the fluid from the diverter 50 as described above. The diverter 50 may also be closed for an added safety barrier during well control to isolate the riser annulus in case the SSBOP 20 is leaking.

During either a well control or riser gas event, the gas and fluid capacity limits of the UMGS 10 are protected using various safety features of the inventive system and method.

Pressure relief valve PRV1 protects the UMGS 10 from over-pressuring while it is in operation, with the relief directed to the overboard line of the rig.

The operating fluid level L0 within the vessel body 12 is maintained relatively constant through the operation of the liquid level control valve LCV1, which ultimately adjusts the fluid level within the UMGS 16 to prevent a low level LL or high level HL fluid level from occurring. As mentioned above, the liquid level sensor 46 and level switches HLI and LLI feedback to the central control and processing module (not shown), which may transmit a signal to the liquid level control valve LCV1 for the adjustment of the fluid level in the vessel body 12. For example, if the liquid level sensor 41 determines that the liquid level L0 has dropped below a desired level, the liquid level control valve LCV1 will be closed to restrict or even stop the flow of liquid through the drilling fluid liquid outlet port 18 to the shaker 54. If the fluid level is still decreasing and reaches the minimum allowed LL point in the vessel 16, the UMGS overboard diversion valve G1 is opened and the liquid level control valve LCV1 is closed to prevent gas blow by from the UMGS 10 through the liquid outlet port 18 to the shakers 54. All flow out of the UMGS liquid outlet port 18 is dispersed overboard at the UMGS discharge point 72 once the valve sequence completes. The system will also alert the rig crew when the LLI or HLI levels are exceeded.

Alternatively, if the liquid level sensor 41 indicates that the liquid level L0 has reached a higher level than desired, the liquid level control valve LCV1 will be opened further to increase the rate of flow of liquid through the drilling fluid liquid outlet port 18 to the shaker 54. If, during riser gas handling, the fluid level L0 is still rising, and reaches the maximum level HL, all flow may be diverted overboard through the overboard diversion line 66 by opening diverter valve DV2. Alternatively, or during well control, this can be achieved by opening the UMGS overboard discharge valve G1. Liquid from the UMGS can then flow along the UMGS discharge line 70 to be discharged overboard at the UMGS discharge point 72. This prevents liquid carry over from occurring through the vent line 28 of the UMGS 10.

The sequence of operation of the diverter 50 and the valves DV2, DV3, DV4. LCV1 and G1 described above may be preprogrammed into the central control and processing module, to that the valves are operated in a remote and automated sequence with a built in interlock process for their programmed operation. Interlocking is the method of preventing undesired states within the UMGS through a programmed automated electronic-mechanical manipulation of the valves, and is well known in the art. The interlock would, for example, ensure that at least one of DV2 or DV3 is opened, and DV4 closed, before the diverter 50 is closed. It would also ensure that one of DV2 DV3, and DV4 is open at all times during drilling and/or a well control event.

It is appreciated the inventive system and method described herein is suitable for replacing the conventional rig MGS within any given well control and diverter circulating system on land rigs, fixed offshore installations, and floating installations.

One embodiment of the invention (which does not require the provision of the secondary separator) is to use the system to conduct a flow check into a closed system with degassing capability. This is not existent on the conventional rig-up where this may be carried out into an atmospheric trip tank (not shown) downstream of the diverter 50. This practice is inherently dangerous as the trip tank is not designed as a gas capable vessel and it is well known in the industry that such practice may result in trip tank rupture.

The liquid level sensor 41 on the vessel body 12 of the primary separator may be used as part of the flow check process.

Depending on how the flow paths to the UMGS 10 are lined up, the flow check may be performed to confirm whether or not there is flow in the wellbore beneath the SSBOP 48, in the riser 46 above the SSBOP 48 or both. In either case, a valve that is capable of holding back the potential to flow is opened to create a non-pressurized path to the UMGS 10 to determine if the well and or riser will flow on its own due to the presence of hydrocarbons or an underbalance of wellbore with respect to formation pressure. While the concept of a flow check is simple in theory, confirmation of an underbalance or the presence of gas becomes complicated by the fact that wellbore breathing or the release of trapped pressure can also create flow but only for a transient period and at a decreasing rate. Contrastingly, flow from gas or an underbalance is expected to exist for an extended period of time and at a stable to increasing rate. With these differences taken into account, the determination of presence of a hazardous flow versus wellbore breathing or the release of trapped pressure can be made in the most rapid manner by analysing the change in flow rate over time.

Wellbore breathing can occur when the formation flows a small amount of drilling fluid back into the well after a drop in bottom hole pressure. Typically this occurs when the mud pumps are shut-down or back pressure on the wellbore is relieved. Trapped pressure can occur if control valves trap pressure in the wellbore due to simultaneously running the mud pump or riser booster pump while the valve is in the process of closing.

A flow check can be carried out by combining the output of the liquid level sensor 41 with a timing device to determine a liquid flow rate into the UMGS vessel body 12 when G1 and LCV1 are closed. Using basic geometry, the change in the working level of fluid in the vessel body 12 can be used to determine a change in volume, commonly reported by those skilled in the art as gallons. By analysing the change in volume over time, a flow rate can be calculated, often reported as gallons per minute. By monitoring the flow rate over time, one can determine if the flow rate is decreasing, indicating a release of trapped pressure or wellbore breathing, or if the flow rate is stable or increasing, indicating an underbalance or the presence of hydrocarbons or that the mud pumps and/or riser booster pumps have been inappropriately left on. Diagnosing the cause of flow in this way may mean that a hazardous source of flow can be identified with confidence in a more rapid fashion, as opposed to waiting for an extended period of time to determine if the change in liquid level L0 in the UMGS 10 has increased beyond a subjectively chosen amount. In the event that the system detects a flow rate trend over time that indicates flow from a hazardous source, the system may once again regulate liquid levels to a safe level with LCV1. The CPU may also trigger an alarm to notify rig crew of the indication of gas or an underbalance.

During the a flow check, if the liquid sensing system does not indicate flow from an unsafe source prior to liquid level reaching an excessive level, the HLI switch will be triggered causing the rig crew to be alerted and returns to be diverted overboard prior to reaching the vessel or commence controlling the liquid level with LCV1. Recent developments in the drilling industry have required the use of highly precise flow meters, on the flow line downstream of the riser to facilitate a measurement of flow rate behaviour over time. However, a device that combines the radar sensor and timing device in the UMGS 10 can serve the same function as a flow meter at a lower cost and without the need for additional equipment on the rig. Despite the capability to measure flow rates, this device can also still be used to simply check the level of working fluid in the UMGS 10 as well.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. An apparatus for degassing drilling fluid comprising a primary separator and a secondary separator, the primary separator comprising a vessel body having an inlet port, a liquid outlet port located at a lower end of the vessel body, and a gas vent port located at an upper end of the vessel body, the secondary separator having an inlet port which is connected to the gas vent port of the primary separator, a gas outlet port, and a liquid outlet port which is connected to the interior of the vessel body of the primary separator via a liquid return line, wherein gas leaving the vessel body of the primary separator via the primary separator gas vent port enters the secondary separator via the inlet port of the secondary separator.

2. An apparatus according to claim 1 wherein the inlet port of the secondary separator is connected exclusively to the gas vent port of the primary separator.

3. An apparatus according to claim 1 wherein the liquid outlet port of the second separator is directly connected to the interior of the vessel body of the primary separator via a liquid return line.

4. An apparatus according to claim 1 wherein the inlet of the primary separator is provided with a primary diverter assembly which splits the incoming fluid into a lower density stream which is predominantly gas with entrained solids and liquids, and a higher density liquid stream which is predominantly liquid with entrained gas and solids.

5. An apparatus according to claim 1 wherein the inlet of the primary separator is located in an upper region of the vessel body.

6. An apparatus according to claim 1 wherein the primary separator is further provided with a liquid seal which is connected to the liquid outlet port.

7. An apparatus according to claim 1 wherein the primary separator is provided with a liquid level sensing system which is operable to provide an indication of the surface level of liquid collected in the bottom of the vessel body.

8. An apparatus according to claim 1 wherein the secondary separator comprises a cyclone separator which has a housing which is configured to divert the flow of a gas stream entering the housing via the inlet of the cyclone separator so that the gas stream it flows in a generally circular flow path around a vortex chamber within the housing.

9. An apparatus according to claim 8 wherein the inlet and gas outlet port of the cyclone separator are arranged along a longitudinal axis of the secondary separator, whilst the liquid outlet port is provided in a portion of the housing which extends generally parallel to the longitudinal axis of the secondary separator.

10. An apparatus according to claim 1 wherein the liquid return line extends down the interior of the vessel body to end at a point in the lowermost portion of the vessel body.

11. A drilling system including an apparatus for degassing drilling fluid according to claim 1 wherein the drilling system includes a riser which extends between an subsea blowout preventer mounted on a wellhead at the top of a wellbore, and a diverter which has a returns port which is connected to the inlet of the primary separator via a returns line, the returns line containing a diversion flow valve which is operable to permit or substantially prevent flow of fluid from the returns line to the primary separator.

12. A drilling system according to claim 11 further comprising a drilling fluid reservoir, wherein the liquid outlet port of the primary separator is connected to the drilling fluid reservoir via a liquid seal.

13. A drilling system according to claim 12 wherein a liquid level control valve is provided in a line between the liquid seal and the drilling fluid reservoir, the liquid level control valve being operable to stop, or restrict to a variable extent, flow of fluid from the liquid outlet of the primary separator to the drilling fluid reservoir.

14. A drilling system according to claim 11 wherein the drilling system also includes an overboard diversion line which extends from the returns line to a discharge point where riser fluid may be discharged relatively safely, and an overboard diverter valve is provided in the overboard diversion line, the overboard diverter valve being operable to either permit or substantially prevent flow of fluid along the overboard diversion line.

15. A drilling system according to claim 11 wherein a further overboard diversion line extends from the liquid seal to a further discharge point wherein fluid from the primary separator may be discharged relatively safely, and a further overboard discharge valve is provided in the further overboard diversion line, the further overboard discharge valve being operable to either permit or substantially prevent flow of fluid along the further overboard diversion line.

16. A drilling system according to claim 11 wherein the returns line is also connected to the drilling fluid reservoir via a main diverter flow line, the main diverter flow line including a diverter valve which is operable to either permit or substantially prevent flow of fluid from the returns line to the drilling fluid reservoir.

17. A drilling system according to claim 11 wherein the drilling system further includes a rig choke and kill manifold which is connected to a wellbore annulus below the subsea BOP via a well control choke line, the choke and kill manifold being, in turn, connected to the inlet of the primary separator via a choke valve which is operable to either permit or substantially prevent flow of fluid from the choke and kill manifold to the inlet of the primary separator.

18. A method of operating a drilling system including a separator comprising a vessel body having an inlet port, a liquid outlet port located at a lower end of the vessel body, a liquid level control valve operable to control or prevent flow of fluid out of the vessel body through the liquid outlet port, a gas vent port located at an upper end of the vessel body, and a liquid level sensing system that measures a surface level of liquid collected in the bottom of the vessel body and provides an output representing the surface level, the method including monitoring the output from the liquid level sensing system to monitor the rate of change in liquid level in the vessel body over time to determine a flow rate trend over time.

19. The method according to claim 18 wherein the method further comprises closing the liquid level control valve prior to monitoring the output from the liquid level sensing system.

20. The method according to claim 18 wherein the method further comprises using the liquid level control valve to regulate automatically the liquid level in the separator.

21. The method according to claim 18 wherein the method further includes initiating an alert procedure if the liquid level sensing system detects that the liquid level has exceeded a predetermined level.

22. A method according to claim 18 wherein the drilling system is also provided with a drilling fluid reservoir and the liquid outlet port of the separator is connected to the drilling fluid reservoir via a liquid seal, the liquid level control valve being provided in a line between the liquid seal and the drilling fluid reservoir, and being operable to stop, or restrict to a variable extent, flow of fluid from the liquid outlet of the primary separator to the drilling fluid reservoir.

23. A method according to claim 18 wherein the inlet of the separator is provided with a primary diverter assembly which splits the incoming fluid into a lower density stream which is predominantly gas with entrained solids and liquids, and a higher density liquid stream which is predominantly liquid with entrained gas and solids.

* * * * *